(12) United States Patent
Yan

(10) Patent No.: US 7,967,569 B2
(45) Date of Patent: Jun. 28, 2011

(54) VERTICAL SHAFT WIND TURBINE AND METHOD OF INSTALLING BLADES THEREIN

(76) Inventor: Qiang Yan, Shanghai (CN)

( * ) Notice: Subject to any disclaimer, the term of this patent is extended or adjusted under 35 U.S.C. 154(b) by 141 days.

(21) Appl. No.: 12/234,784

(22) Filed: Sep. 22, 2008

(65) Prior Publication Data

US 2009/0016892 A1 Jan. 15, 2009

Related U.S. Application Data

(63) Continuation of application No. PCT/CN2007/000958, filed on Mar. 26, 2007.

(30) Foreign Application Priority Data

Mar. 29, 2006 (CN) .......................... 2006 1 0025202

(51) Int. Cl.
  *F03D 3/06* (2006.01)
(52) U.S. Cl. ................ 416/210 R; 416/211; 416/200 R; 416/223 R; 415/4.2; 415/87; 415/907

(58) Field of Classification Search ................... 415/4.2, 415/4.4, 83, 86, 87, 907; 416/210 R, 211, 416/200 R, 200 A, 223 R, 237
See application file for complete search history.

(56) References Cited

U.S. PATENT DOCUMENTS

| | | | | | |
|---|---|---|---|---|---|
| 1,835,018 | A | * | 12/1931 | Darrieus | 415/224 |
| 4,115,027 | A | * | 9/1978 | Thomas | 415/53.1 |
| 4,415,312 | A | * | 11/1983 | Brenneman | 416/119 |
| 6,688,842 | B2 | * | 2/2004 | Boatner | 415/4.2 |
| 6,974,309 | B2 | * | 12/2005 | Seki | 416/227 R |
| 7,360,995 | B2 | * | 4/2008 | Suzuki | 416/211 |
| 7,390,163 | B2 | * | 6/2008 | Clauson | 415/83 |

* cited by examiner

Primary Examiner — Igor Kershteyn
(74) Attorney, Agent, or Firm — Matthias Scholl P.C.; Matthias Scholl

(57) ABSTRACT

This invention relates to a vertical shaft wind turbine, and particularly to an installation method of blades that can effectively improve the efficiency of a vertical shaft wind turbine. A supporting plane is connected to vertical shaft and a blade is installed on supporting plane. The airfoil of the blade is an asymmetrical camber airfoil. The convex surface of blade is installed facing the vertical shaft. The blade rotary angle is in the range of 0-15 degrees. This invention represents a remarkable progress in the field of wind power generation and is applicable industrially.

20 Claims, 3 Drawing Sheets

VERTICAL SHAFT WIND TURBINE AND METHOD OF INSTALLING BLADES THEREIN

CROSS-REFERENCE TO RELATED APPLICATIONS

This application is a continuation-in-part of International Patent Application No. PCT/CN2007/000958 with an international filing date of Mar. 26, 2007, designating the United States, now pending, and further claims priority benefits of Chinese Patent Application No. 200610025202.7 filed Mar. 29, 2006. The contents of the aforementioned specifications, including any intervening amendments thereto, are incorporated herein by reference.

BACKGROUND OF THE INVENTION

1. Field of the Invention

This invention relates to a vertical shaft wind turbine, and particularly to an arrangement and installation method of blades that can effectively improve the efficiency of a vertical shaft wind turbine.

2. Description of the Related Art

To make better use of wind energy, wind power generation devices have been developed. These can be divided according to the different position of the rotary shaft of the wind turbine into: horizontal shaft wind turbines and vertical shaft wind turbines.

The wind wheel of a vertical shaft wind turbine comprises straight blade 1 with airfoil-shaped cross section, as shown in FIG. 1. The axial line of blades is parallel to the main shaft, i.e., the vertical shaft 2. Airfoil design is a major facet of aerodynamics. Various airfoils serve different flight regimes.

Conventional asymmetric airfoils used in lifting type vertical shaft wind turbines with fixed blade rotary angle have a convex surface 11 and a concave surface 12. Traditional arrangement of the blade is to orient the concave surface 12 facing toward the vertical shaft 2, as shown in FIG. 2.

However, in fact, it is this incorrect installation that results in poor wind energy utilization rate of vertical shaft wind turbines. Extensive experiments have shown that the existing blade installation method for vertical shaft wind turbines is not most optimal in actual industrial production.

Chinese Pat. No. CN1719023A discloses a wind turbine with a complex action of resistance and lifting. The angle between the chord of the airfoil blade 1 and the blade link rod 2 is 60-70 degrees. The blade rotary angle range corresponds to between 20 and 30 degrees. The action of resistance and lifting is complex due to difference in rotation direction between the resistance type wind wheel and lifting type wind wheel. The vertical wind wheel cannot be made as resistance and lifting type simultaneously.

SUMMARY OF THE INVENTION

In view of the above-described problems, it is one objective of the invention to provide a vertical shaft wind turbine and a method of blade installation in vertical shaft wind turbine.

According to aerodynamics, the angle between the blade chord line and the tangent to the wind wheel-turning circle is termed blade rotary angle. The blade rotary angle is shown in FIG. 3. By convention, the clockwise rotary angle of the blade is positive and counterclockwise rotary angle negative.

To achieve the above objectives, in accordance with one embodiment of the invention, provided is a vertical shaft wind turbine and an installation method of blade in vertical shaft wind turbine, comprising: supporting plane connected to vertical shaft, and blade installed on supporting plane; wherein the airfoil of the blade is asymmetric camber airfoil; and the blade is installed with convex surface of the blade facing vertical shaft.

In certain classes of this embodiment, the rotary angle of the blade is between 0 and 15 degrees.

In certain classes of this embodiment, the preferred rotary angle of the blade is between 0 and 12 degrees.

In certain classes of this embodiment, the ambient wind velocity generating the optimal power is between 5 and 25 m/s, preferably between 6 and 13 m/s.

In certain classes of this embodiment, the surface of the blade consists of a convex surface and a flat surface.

In certain classes of this embodiment, the surface of the blade consists of a convex surface and a concave surface.

In certain classes of this embodiment, the blade rotary angle is set in a very small range.

Table 1 shows a maximum power output measurement for a wind wheel with a blade concave surface facing outward, using a wind speed fixed at 10 m/s, constant airfoil, constant dimensions of wind wheel and blade, constant number of blades, constant wind speed, but variable blade rotary angle.

TABLE 1

| Blade rotary angle | 0° | 8° | 12° | 15° | 18° | 30° |
|---|---|---|---|---|---|---|
| Power | 142 | 128 | 90 | 40 | 15 | −40 (in reverse rotation direction) |

Table 2 shows a maximum power output measurement for a wind wheel with a blade concave surface facing outward, using a wind speed fixed at 10 m/s, constant airfoil, constant dimensions of wind wheel and blade, constant number of blades, constant wind speed, but variable blade rotary angle.

TABLE 2

| Blade rotary angle | −6° | 6° |
|---|---|---|
| Power (Watt) | 25 | 12 |

Comparing data shown in Tables 1 and 2, a mere installation of the blade concave surface outward, as mentioned in the Chinese Pat. No. CN1719023A, is not a sufficient condition for improving the efficiency of wind wheel. Only with the concave surface facing outward and the blade rotary angle is set appropriately (0-15 degrees as specified in embodiments of this invention), can a higher efficiency obtained by the wind wheel.

The invention will be described by way of example and with reference to the accompanying drawings.

BRIEF DESCRIPTION OF THE DRAWINGS

The invention will now be described solely by way of example and with reference to the accompanying drawings, in which.

DETAILED DESCRIPTION OF THE INVENTION

The following examples are presented for the purpose of better understanding of this invention, rather than limitation of this invention.

Example 1

Standard airfoils GOE573, GOE630, GOE364, GOE436, GOE118 and GOE147 were installed by connecting the supporting plane to a vertical shaft and attaching blades to the supporting plane. The convex surfaces were oriented to face the vertical shaft, and the blade rotary angles were set at 12 degrees.

At the wind speed of 10 m/s, the load bearing (in N) of individual blades is tested at different positions in the circumference every 30 degrees. Take clockwise direction is taken as positive and counterclockwise direction as negative. The data are obtained as shown Table 3.

TABLE 3

| Airfoil/Angle | 0° | 30° | 60° | 90° | 120° | 150° | 180° | 210° | 240° | 270° | 300° | 330° |
|---|---|---|---|---|---|---|---|---|---|---|---|---|
| G573 | −3.6 | 6.3 | 2.8 | 3.9 | 3.6 | 3.6 | 2.2 | 0.6 | 1.2 | 0 | −3.2 | −5.2 |
| G630 | −3 | 8.8 | 3.2 | 4 | 3.2 | 3.3 | 1.8 | 1.3 | 0.8 | −0.4 | −3.1 | −4.7 |
| G364 | −3.1 | 9.5 | 3.8 | 4.9 | 3.3 | 3.2 | 1.8 | 1 | 0.3 | −0.7 | −3.2 | −4.5 |
| G436 | −3.6 | 7.5 | 3.8 | 4.3 | 4 | 3.6 | 1.5 | 0 | 0 | −1.5 | −4 | −5 |
| G118 | −3.2 | 8.5 | 3.4 | 4.2 | 3 | 2.8 | 2 | 1 | 0 | −1 | −4 | −4.9 |
| G147 | −3.2 | 2.6 | 4 | 4.3 | 3.2 | 3.2 | 1.4 | 0 | −0.5 | −1.5 | −3.9 | −4.7 |

For comparison, when the concave surfaces were installed to face the vertical shaft, with other conditions remaining unchanged, the wind wheel did not rotate, and its driving moment could not be measured.

Example 2

With GOE 364 blades attached to a wind wheel having a diameter of 1.36 m and blade length of 1 m, fixed blade rotary angles (in degrees) were set for different wind speeds (in m/s). The output power of generator was measured (in Watt), and is shown in Table 4.

TABLE 4

| Blade rotary angle (degrees) | Wind speed (meters per second) | | | | | | | |
|---|---|---|---|---|---|---|---|---|
| | 6 | 7 | 8 | 9 | 10 | 11 | 12 | 13 |
| 2 | 19 | 30 | 71 | 110 | 154 | 209 | 275 | 360 |
| 5 | 17 | 27 | 65 | 100 | 140 | 190 | 250 | 330 |
| 8 | 14 | 22 | 46 | 67 | 128 | 170 | 225 | 300 |
| 12 | 9 | 15 | 45 | 60 | 90 | 120 | 150 | 200 |

Figure 1:
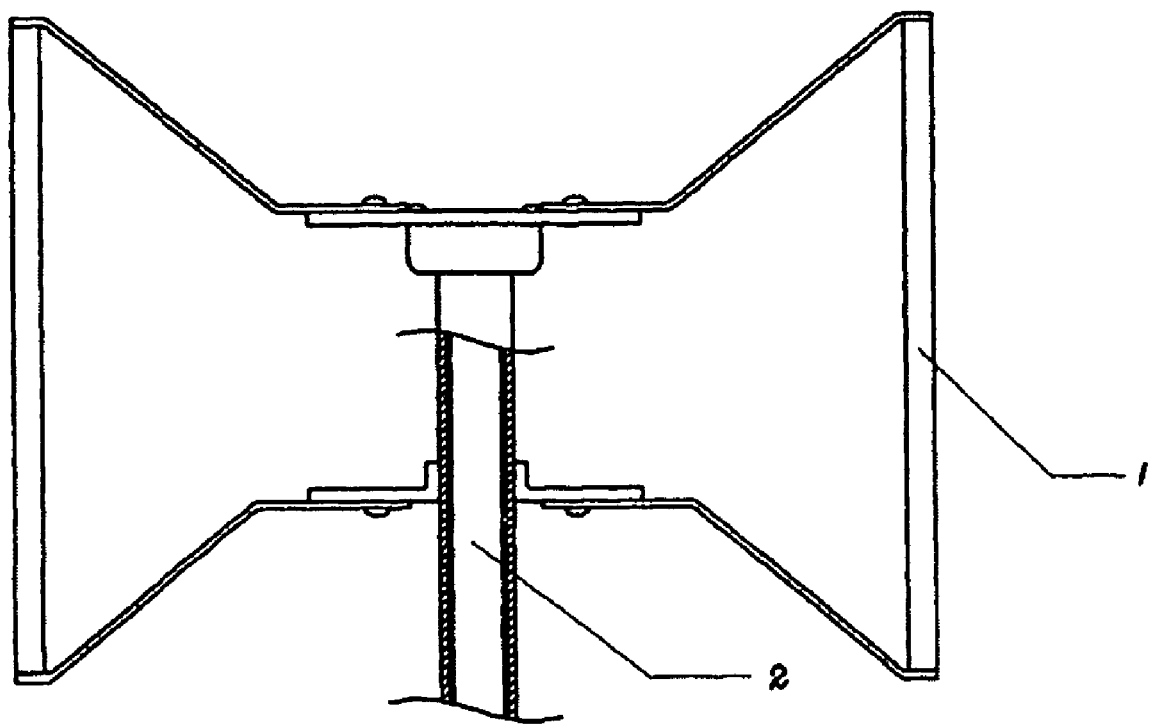
FIG. 1 shows conventional blades used in vertical shaft wind turbines.
Figure 2:
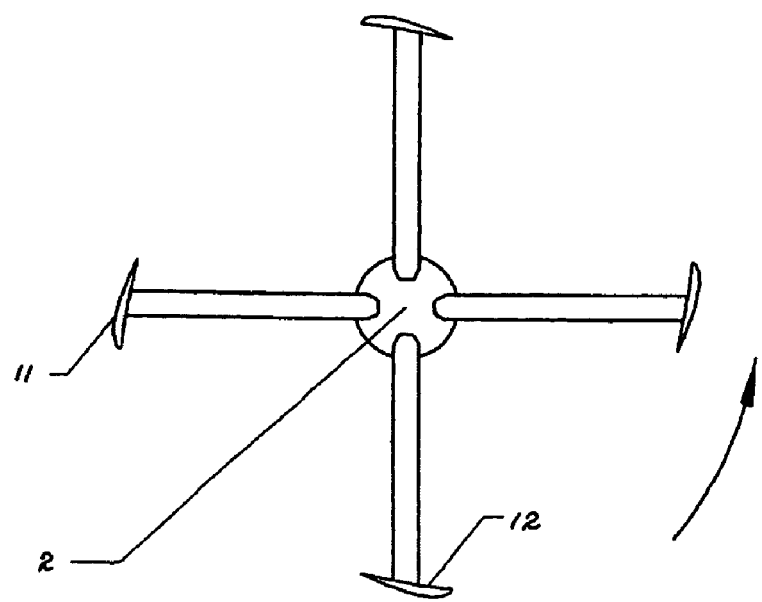
FIG. 2 shows a schematic diagram of conventional vertical shaft wind turbines.
Figure 3:
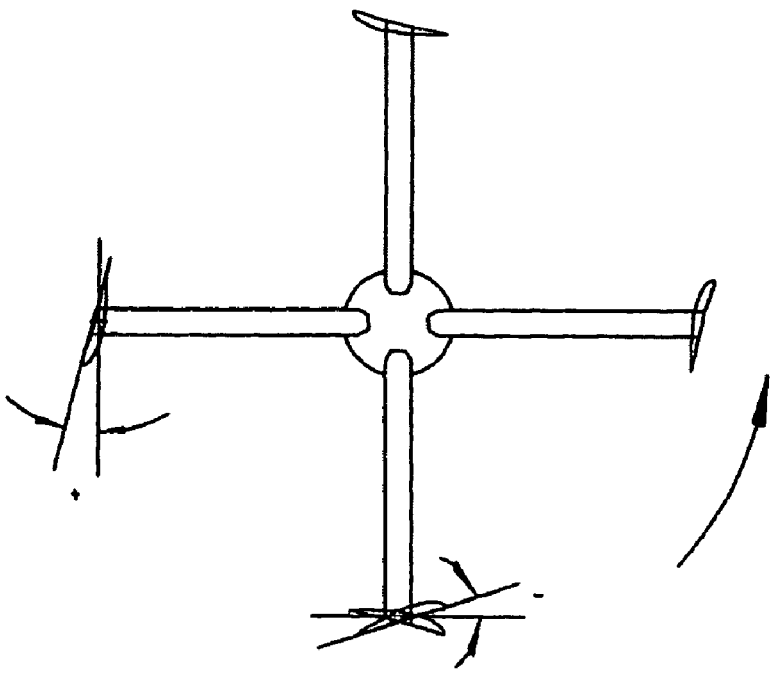
FIG. 3 shows a schematic diagram of a vertical shaft wind turbine according to one embodiment of this invention.
Figure 4:
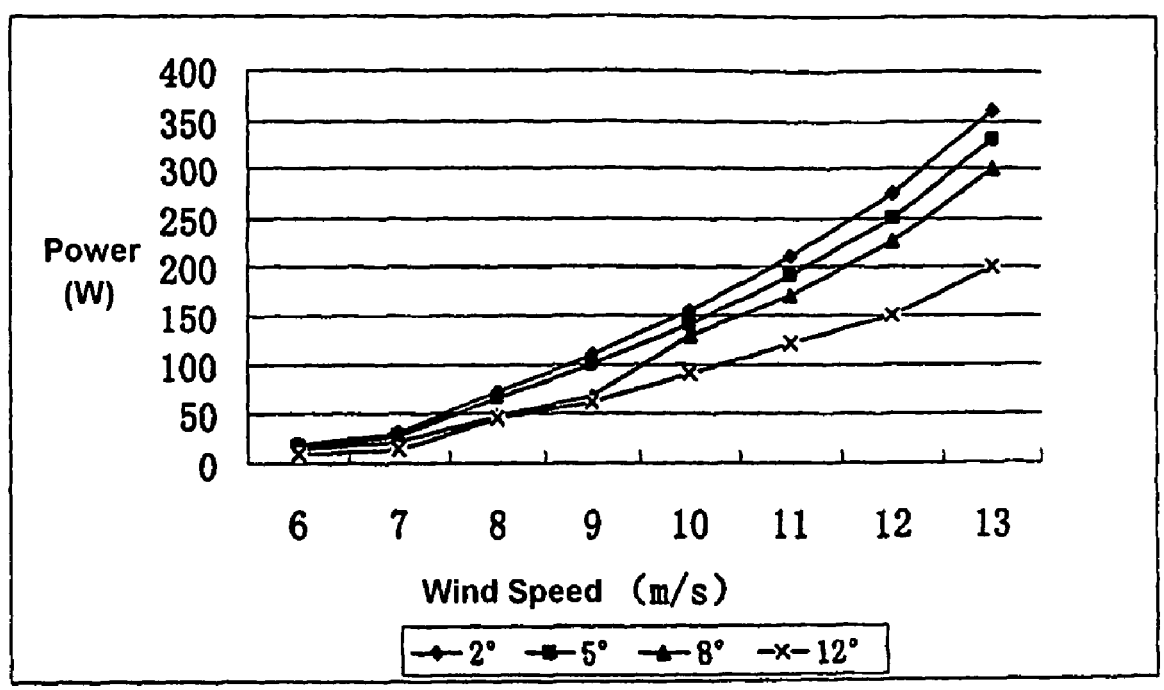
FIG. 4 shows a graph illustrating a relationship between the wind speed and the output power at different blade rotary angles according to Example 2 of this invention.

As shown in FIG. 4, when the blade angle is in the range of 2-12 degrees and the wind speed in 6-13 meters per second, the output power is 9-360 Watt. Comparatively, ideal output power is obtained.

Example 3

Take GOE364 blades from Example 1, and wind wheel in the same diameter as that in Example 2, and the same blade length and fixed blade rotary angle as those in Example 2. Under the same wind power conditions, install the blades with concave surface 12 facing vertical shaft 2. Other test conditions are the same as those in Example 2. The test of wind turbine is carried out and the result shows that, the wind wheel cannot rotate, i.e., the generator produces no output power, and has no industrial applicability.

To sum up, in a natural environment, a wind speed between 6 and 13 meters per second is ideal for wind energy utilization. Therefore, this invention has industrial applicability.

Although detailed explanations and certain examples have been provided by this invention, it is obvious that skilled artisans can make variations and corrections without departing from the design idea and range of the invention.

The invention claimed is:

1. A vertical shaft wind turbine, comprising:
    a vertical shaft;
    a supporting plane;
    a plurality of blades each having an airfoil as a cross-section and having a convex surface and a concave surface;
    wherein,
    said airfoil of said blade is an asymmetrical camber airfoil;
    each said blade is installed with only the convex surface facing the vertical shaft, and
    a blade rotary angle of each blade is between 0 and 15 degrees.

2. A method for installing blades in the wind turbine of claim 1, comprising:
    connecting the supporting plane to the vertical shaft; and
    installing the plurality of blades on the supporting plane.

3. The wind turbine of claim 1, wherein said blade rotary angle of each blade is between 0 and 12 degrees.

4. The wind turbine of claim 1, wherein the wind turbine is optimally designed for a wind velocity between 5 and 25 m/s.

5. The wind turbine of claim 1, wherein each side of said blade has only one type of surface selected from a convex surface or a concave surface.

6. The wind turbine of claim 5, wherein said blade consists of a convex surface and a concave surface.

7. The wind turbine of claim 6, wherein said convex surface and said concave surface are oriented on opposite sides of said blade.

8. The wind turbine of claim 1, wherein said blade rotates in the range consisting of 0 to 15 degrees.

9. A method for improving efficiency of the wind wheel of claim 1, comprising:
    adjusting said blade rotary angle to between 0 and 12 degrees; and exposing said blade to a wind speed of 5 to 25 m/s.

10. A vertical shaft wind turbine, comprising:
    a vertical shaft;
    a supporting plane; and
    a plurality of blades each having an airfoil as a cross-section and having a convex surface and a concave surface;
    wherein, each said blade is installed with only said convex surface facing the vertical shaft.

11. The wind turbine of claim 10, wherein said blade rotates in the range consisting of 0 to 15 degrees.

12. The wind turbine of claim 11, wherein said blade consists of a convex surface and a concave surface.

13. The wind turbine of claim 12, wherein said convex surface and said concave surface are oriented on opposite sides of said blade.

14. The wind turbine of claim 12, wherein each side of said blade has only one type of surface selected from a convex surface or a concave surface.

15. The wind turbine of claim 14, where said airfoil of said blade is an asymmetrical camber airfoil.

16. A vertical shaft wind turbine, comprising:
a vertical shaft;
a supporting plane; and
a plurality of blades each having an airfoil as a cross-section and consisting of a convex surface and a concave surface;
wherein,
each said blade is installed with only said convex surface facing the vertical shaft.

17. The wind turbine of claim 16, wherein said blade rotates in the range consisting of 0 to 15 degrees.

18. The wind turbine of claim 17, wherein said airfoil of said blade is an asymmetrical camber airfoil.

19. The wind turbine of claim 18, wherein each side of said blade has only one type of surface selected from a convex surface or a concave surface.

20. The wind turbine of claim 16, wherein said convex surface and said concave surface are oriented on opposite sides of said blade.

* * * * *